(12) United States Patent
Weber

(10) Patent No.: US 10,898,893 B2
(45) Date of Patent: Jan. 26, 2021

(54) DEVICES FOR AND METHODS OF FORMING MICROCHANNELS OR MICROFLUIDIC RESERVOIRS

(71) Applicant: THINXXS MICROTECHNOLOGY AG, Zweibrücken (DE)

(72) Inventor: Lutz Weber, Zweibrücken (DE)

(73) Assignee: THINXXS MICROTECHNOLOGY AG, Zweibrücken (DE)

( * ) Notice: Subject to any disclaimer, the term of this patent is extended or adjusted under 35 U.S.C. 154(b) by 297 days.

(21) Appl. No.: 15/022,982

(22) PCT Filed: Sep. 10, 2014

(86) PCT No.: PCT/EP2014/069242
§ 371 (c)(1),
(2) Date: Mar. 18, 2016

(87) PCT Pub. No.: WO2015/039934
PCT Pub. Date: Mar. 26, 2015

(65) Prior Publication Data
US 2016/0207041 A1 Jul. 21, 2016

(30) Foreign Application Priority Data

Sep. 20, 2013 (EP) .................................... 13185271

(51) Int. Cl.
*B01L 3/00* (2006.01)
*B29C 65/16* (2006.01)
(Continued)

(52) U.S. Cl.
CPC ........ *B01L 3/502707* (2013.01); *B29C 65/16* (2013.01); *B29C 65/48* (2013.01);
(Continued)

(58) Field of Classification Search
CPC ......... B29C 66/71; B29C 65/16; B29C 65/48; B29C 66/47; B01L 3/502707;
(Continued)

(56) References Cited

U.S. PATENT DOCUMENTS

2003/0026740 A1* 2/2003 Staats ............... B01L 3/502715
422/503
2007/0137779 A1* 6/2007 Mori ................... B29C 65/1635
156/272.8
(Continued)

FOREIGN PATENT DOCUMENTS

EP 2388500 A1 11/2011

OTHER PUBLICATIONS

European Search Report, EP13185271, dated Dec. 2, 2013.
International Search Report, PCT/EP2014/069242, dated Nov. 5, 2014.

*Primary Examiner* — Dennis White
*Assistant Examiner* — Bryan Kilpatrick
(74) *Attorney, Agent, or Firm* — Lucas & Mercanti, LLP; Klaus P. Stoffel

(57) ABSTRACT

A method for forming a microchannel or microfluidic reservoir is described. Methods provided herein include applying a covering over a recess formed in a substrate and bonding the covering to the substrate along seams. Methods provided herein use a substrate having elevated edge regions bordering the recess that project from the surface of the substrate. Bonding seams nm a distance from the elevated edge regions of the recess such that the covering and the elevated edge regions are pressed against each other. Devices for bonding substrates and coverings to make microchannels and microfluidic reservoirs are also provided herein. Devices provided herein can include pressing elements for holding the substrate and the covering together.

(Continued)

Pressing elements provided herein can include recesses and/or elastic layers positioned opposite to one or more recesses in a substrate.

16 Claims, 2 Drawing Sheets

(51) Int. Cl.
  *B29C 65/48* (2006.01)
  *B29K 33/00* (2006.01)
  *B29L 9/00* (2006.01)
  *B29K 21/00* (2006.01)

(52) U.S. Cl.
  CPC ... *B01L 2200/0689* (2013.01); *B01L 2200/12* (2013.01); *B01L 2300/041* (2013.01); *B01L 2300/0816* (2013.01); *B01L 2300/0848* (2013.01); *B01L 2300/0858* (2013.01); *B01L 2400/0481* (2013.01); *B01L 2400/0655* (2013.01); *B29K 2021/003* (2013.01); *B29K 2033/12* (2013.01); *B29L 2009/00* (2013.01)

(58) Field of Classification Search
  CPC ..... B01L 2400/0481; B01L 2200/0689; B01L 2200/027; B01L 3/5027; G01N 2021/056; Y10T 29/49826; B29L 2009/00
  See application file for complete search history.

(56) References Cited

U.S. PATENT DOCUMENTS

| | | |
|---|---|---|
| 2007/0166199 A1 | 7/2007 | Zhou et al. |
| 2010/0303687 A1 | 12/2010 | Blaga et al. |
| 2010/0308051 A1* | 12/2010 | Weber ............... B01L 3/502715 220/266 |
| 2011/0303306 A1* | 12/2011 | Weber ............... B01L 3/502707 137/343 |
| 2012/0187117 A1* | 7/2012 | Weber ............... B01L 3/502707 220/4.12 |
| 2013/0156658 A1 | 6/2013 | Shim et al. |
| 2014/0322100 A1* | 10/2014 | Laermer ................. B65B 3/00 422/505 |

* cited by examiner

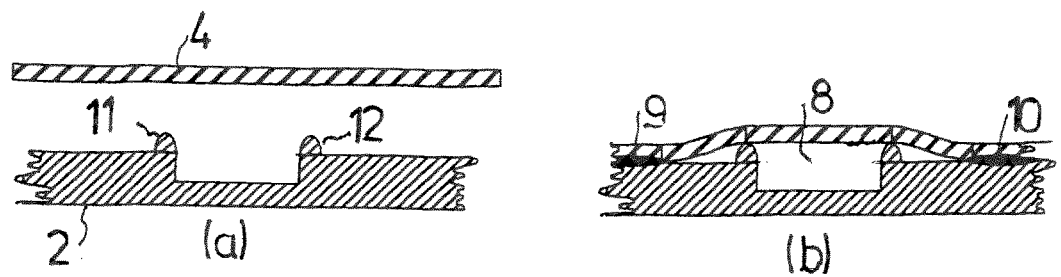
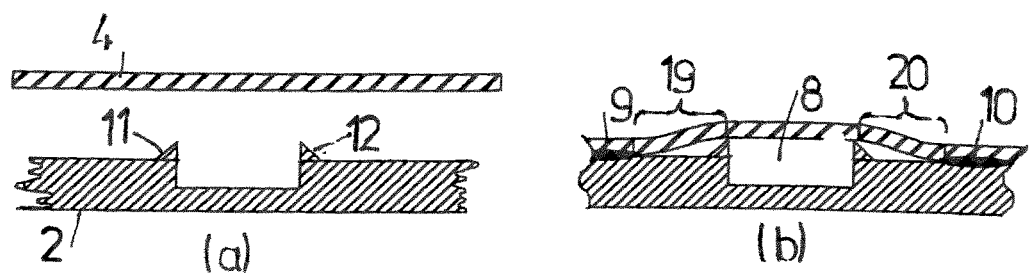
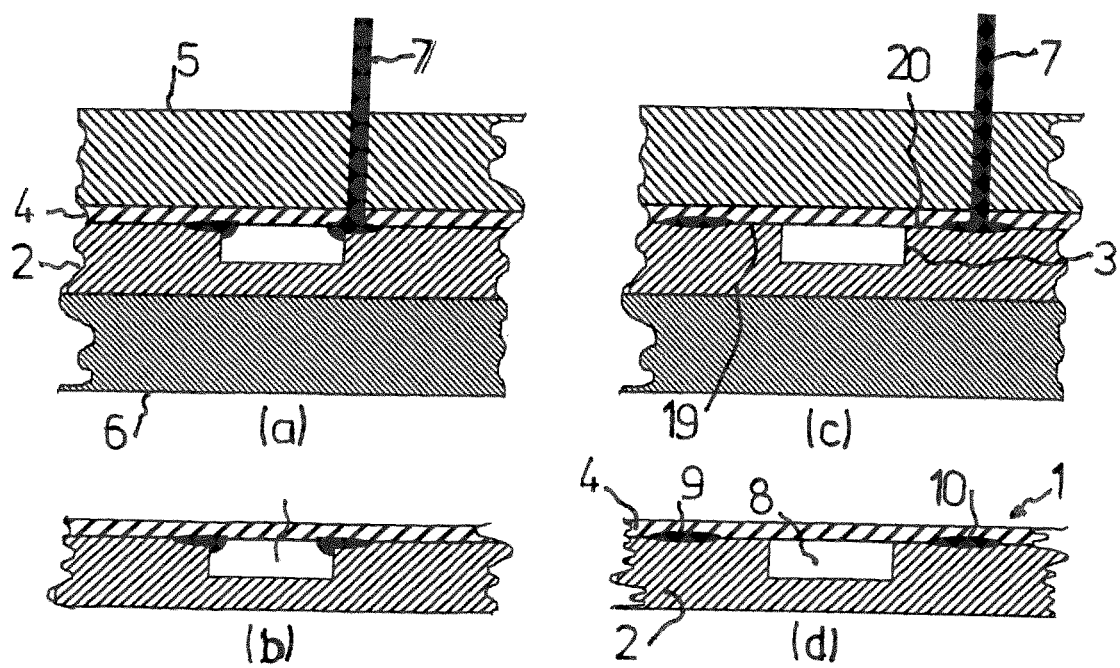
FIG.7 (STATE OF THE ART)

DEVICES FOR AND METHODS OF FORMING MICROCHANNELS OR MICROFLUIDIC RESERVOIRS

The present application is a 371 of International application PCT/EP2014/069242, filed Sep. 10, 2014, which claims priority of EP 13 185 271.7, filed Sep. 20, 2013, the priority of these applications is hereby claimed and these applications are incorporated herein by reference.

TECHNICAL FIELD

This document relates to techniques and devices for making microchannels, microfluidic reservoirs, or a combination thereof. This document also describes the flow cells including microchannels and/or microfluidic reservoirs.

BACKGROUND

Flow cells for analysis and/or synthesis, as are increasingly being used, usually as disposable products, in medical diagnostics in particular, have channels that carry liquids or gases, and possibly reservoirs, which have to meet high requirements in respect of the impermeability and the production precision of the cross-sectional areas and volumes.

In the formation of microchannels and/or reservoirs in plastic flow cells, laser welding is a conventional method of bonding parts that form microchannels and/or microfluidic reservoirs. Forming the microchannels and/or reservoirs involves pressing the parts to be joined against one another, in order to establish a contact between them that is as close as possible, and bonding the parts together.

Conventional laser welding seams have width tolerances in the range of 10 μm to several 100 μm, which is attributable among other things to unevennesses of the areas pressed against one another of the parts to be connected, in particular to the roughness of these areas. In addition, there are numerous other causes of fluctuations of the welding seam dimensions, such as for example thickness fluctuations of the parts to be joined, local fluctuations of the absorption capacity, variations in the laser beam power and in the angle of incidence of the beam, through to local fluctuations of the clamping force holding together the parts to be connected.

SUMMARY

This document provides devices and methods for forming microchannels and/or microfluidic reservoirs with increased precision. Methods and devices provided herein use a substrate having at least one recess and elevated edge regions substrate that project from the surface of the substrate and border the at least one recess.

A method for forming a microchannel or microfluidic reservoir provided herein can include applying a covering over a substrate provided herein and bonding the covering to the substrate along seams. Methods provided herein can have a substrate having elevated edge regions bordering one or more recesses. The elevated edge regions can project from the surface of the substrate. Bonding seams made in methods provided herein run a distance from the elevated edge regions of the recess such that the covering and the elevated edge regions are pressed against each other at a location that is spaced from the bonding seams. Accordingly, the elevated edge regions can be elevated relative to the bonding seams. In some cases, methods provided herein include a step of forming one or more recesses and/or elevated edge regions in a substrate prior to applying a covering to the substrate.

Methods provided herein can, in some cases, use a covering having unstructured sheet areas. The sheet surface of which has no elevations and/or depressions. In some cases, methods provided herein can use a film as the covering. In some cases, a firm covering can include one layer. In some cases, a film covering can include multiple layers bonded together.

Substrates used in the methods and devices provided herein can include a planar surface. In some cases, the planar surface is an area spaced from the elevated edge regions and adapted to receive a bonding seam. In some cases, elevated edge regions include a planar upper surface that is generally perpendicular to the planar surface in a region of the seams. In some cases, elevated edge regions include a triangular tip. In some cases elevated edge regions include a rounded tip. In some cases, a covering is pressed against a triangular tip or rounding of the elevated edge regions after the covering is bonded to the substrate. In some cases, elevated edge regions project from an upper surface of the substrate by a height of between 5 μm and 50 μm. In some cases, elevated edge regions have a peak along the edge of the recess.

Bonding seams can be made by welding or adhesive bonding. For example, in some cases, bonding seams can be made by laser welding. In some cases, a melting zone is formed at the boundary surface between the substrate and the covering in the area where the seams are formed. For example, welding seams of which the melting zone can lie at the boundary surface between the substrate and the covering, which can be efficiently restricted to the region that is decisive for the connection. In some cases, the substrate or the covering can be at least somewhat transparent to the wavelength of the welding beam, which can be between 800 and 1100 nm. In some cases, the substrate or covering can absorb the laser light of the welding beam. For example, the covering can be transparent and the substrate opaque such a laser welding beam can pass through the covering and create a local melt on a planar surface of the substrate to form a welded bonding seam after it solidifies.

A device for forming a microchannel or microfluidic reservoir can include a first pressing element for holding a substrate and a second pressing element for holding a covering. The first and second pressing elements are adapted to hold together the substrate and the covering. In some cases, the second pressing element can include at least one pressing element cavity positioned to be opposite at least one substrate recess when the first and second pressing elements are holding the substrate and the covering together. In some cases, the second pressing element includes an elastically deformable layer. In some cases, an elastically deformable layer and/or recesses in the second pressing element can be restricted to an area surrounding recesses and/or elevated edge regions of the substrate.

Methods provided herein can produce microchannels and/or microfluidic reservoirs having edge regions that are elevated with respect to the bonding seams (e.g., welding seams or adhesive bonded seams) between the covering and the substrate. The substrate and the covering are bonded to one another while producing a pressing force of the covering against the elevated edge regions.

A pressing force between the elevated edge region and the covering can, in some cases, prevent the formation of fluid-receiving edge gaps. In some cases, methods provided herein can produce channels with a cross section that is exactly constant in the direction of flow.

Methods and devices provided herein can use a stiff covering the stiffness of which (e-modul) is in the range between 1 and $10^5$ N/mm$^2$, preferably between $10^3$ and $5\times10^3$ N/mm$^2$. In some cases, the covering has a stiffness sufficient such that the rising curvature of the elevated edge regions cause a correspondingly pressing force during the pressing together of the substrate and the covering.

In some cases the covering has unstructed sheet areas without elevations and/or depressions.

The details of one or more embodiments are set forth in the accompanying drawings and the description below. Other features and advantages will be apparent from the description and drawings, and from the claims.

DESCRIPTION OF DRAWINGS

FIGS. 5 and 6 show microchannels produced by the method provided herein, the coverings of which lie linearly against elevations on a substrate.

FIG. 7 depicts an example of microchannels can be made without elevated edge regions.

Like reference symbols in the various drawings indicate like elements.

DETAILED DESCRIPTION

This document provides methods and devices for forming microchannels and microfluidic reservoirs.

Figure 1:
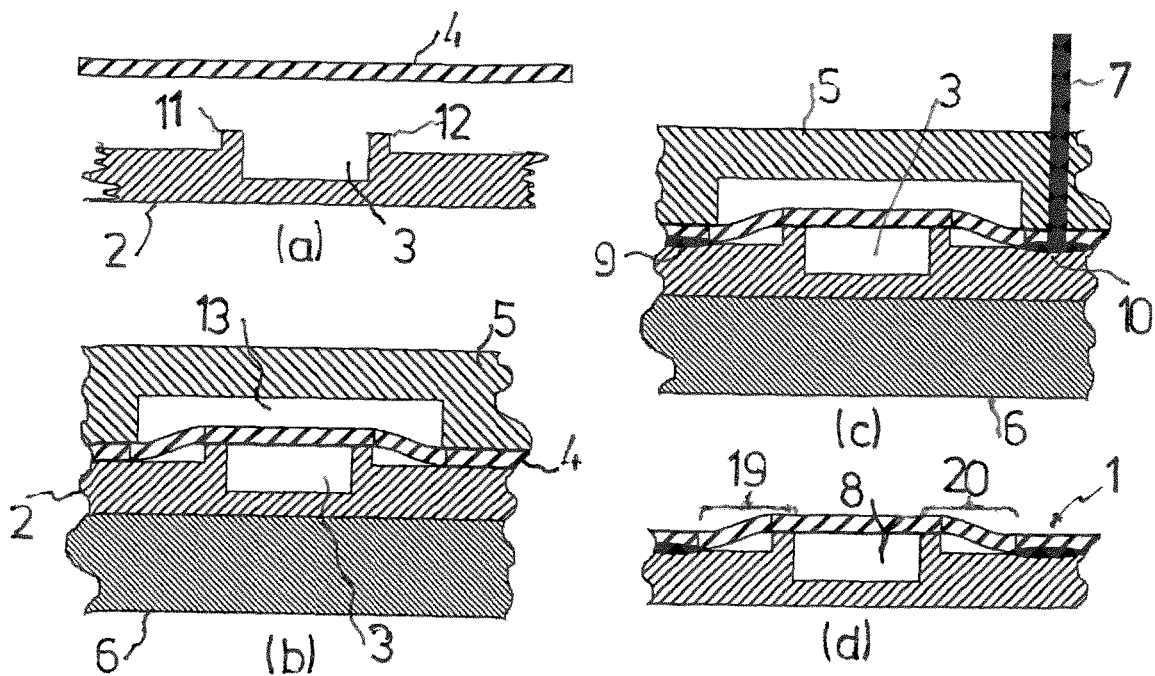
FIG. 1 shows a diagram explaining a first example of how the method provided herein is carried out.

FIG. 1 depicts an exemplary method provided herein for making a microchannel. As shown in FIG. 1d, the formed microchannel 8 in flow cell 11 is formed between a substrate 2 and a covering 4 due to the presence of a recess 3 (e.g., a grove) in the substrate 2, which is closed by the covering 4. Edge regions 19, 20, border the recess 4 on the substrate 2. Elevated edges 11, 12 project from a surface of the substrate 2. The substrate 2 can be a film.

A welding device, shown in parts in FIGS. 1b and 1c, includes pressing elements 5 and 6, pressing the substrate 3 and the covering 4 together, and also devices for producing a laser welding beam 7 in each case at a lateral distance from the recess 3. The pressing element 5 has a pressing element cavity 13, which is to be arranged opposite the substrate recess 3 and extends to near a location where bonding seams 9 and 10 are to be produced. In some cases, the pressing element 5 can be transparent, so that the laser welding beam 7 can pass through it unhindered.

The pressing elements 5, 6 press the substrate 2 and the covering 4 firmly together during the welding by the laser welding beam 7, the covering 4 being stretched over the elevated edges 11, 12. In the elevated edge regions 19, 20, a pressing pressure thus occurs, largely preventing gaps that are suitable for receiving fluid from remaining between the covering 4 and the elevations 11, 12. The channel 8 that is formed has exactly the cross-sectional form that is bounded by the recess 4 and the planar area of the covering. Instances of uncontrolled widening of the cross-sectional area as a result of gaps at the edges are avoided.

In some cases, covering 4 can be largely transmissive for the laser light of the laser welding beam 7, while the substrate 2 greatly absorbs the laser light. In some cases, covering 4 can produce a laser lens at the boundary surface between the covering 4 and the substrate 2.

The substrate 3 and the covering 4 can be made of any suitable material. In some cases, the substrates and coverings provided herein can include a plastic material, for example of PMMA, PC, PS, COC, COP or PEEK. In some cases, the substrate material can include a pigmentation that increases absorption of energy, for example carbon black pigmentation. In some cases, different materials can be used for the covering and the substrate. For example PMMA can be used for the substrate and a thermoplastic elastomer (TPE) can be used for the covering.

In some cases, a substrate used in methods provided herein can be produced by an injection-moulding processes, an extrusion process, or any other suitable process. In some cases, a substrate having recesses and elevated edge regions can be produced by injection moulding. In some cases, a substrate can be extruded and a machined to form an upper surface with recesses and elevated edge regions. In some cases, a film substrate can be extruded and then compression molded to from recesses and elevated edge regions.

The covering, in some cases, can include one or more layers. In some cases, the covering includes multiple laminated layers. In some cases, the upper surface and lower surface of the covering is unstructured.

The thickness of the substrate, in some cases, is between from 1 to 5 mm. The thickness of the covering, in some cases, is between 0.01 and 1 mm, preferably 0.05 and 0.3 mm.

Recesses in the substrate can have any suitable dimensions. Typical channel dimensions can lie in the range of $10\times10$ μm to $1000\times1000$ μm. In some cases, the height of the elevated edge regions typically lies in the range from 5 to 50 μm. In some cases, tolerances of the channel dimensions that can be achieved with the methods provided herein are approximately 1 μm. In some cases, a distance between a channel and a bonding seam can be between 50 and 500 μm.

Figure 2:
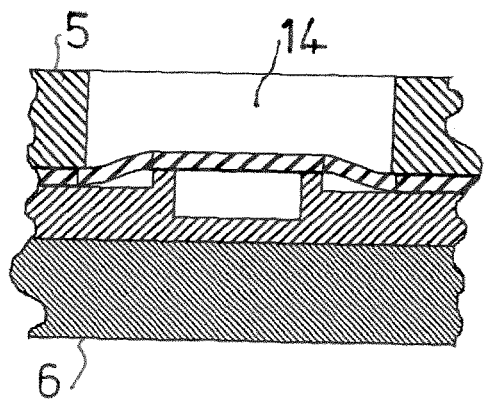
FIGS. 2 and 3 show two further exemplary embodiments of parts of welding devices.
Figure 3:
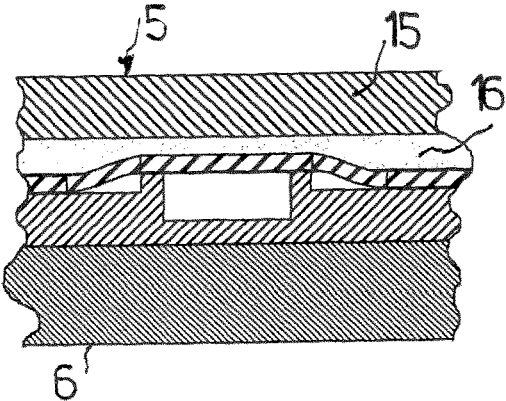

Pressing mounts of laser welding devices that are shown in FIGS. 2 and 3 have different transparent pressing elements 5 than the device from FIG. 1.

In the case of the pressing element 5 from FIG. 2, an aperture 14 is provided instead of a recess 13, and can be produced more easily in a transparent pressing plate formed from glass than the recess 13 that is shown in FIG. 1.

The pressing element 5 of the exemplary embodiment from FIG. 3 is formed with two layers 15 and 16, of which the layer directly exerting the pressing force is elastically deformable and consists, for example, of silicone, which has a high degree of transparency to the laser welding beam. The thickness of the elastic layer 16 is typically 0.1 to 1 mm.

The elastic layer may also be provided with a clearance over the recess 3 and the adjacent edge regions 19, 20. The layer 15, which is preferably a glass plate, advantageously does not have to be structured.

Figure 4:
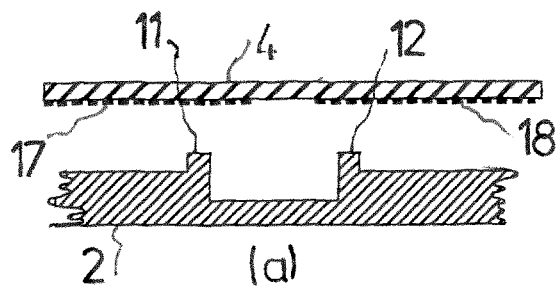
FIG. 4 shows a microchannel produced by the method provided herein in which electrodes are included on the covering.

FIG. 4 shows the use of a covering 4, on which electrode tracks 17 and 18 are formed, for example by the PVD process or by laser structuring. The height of the electrode tracks can be in the range between 0.01 and 0.1 μm. The electrode tracks 17, 18 cross both the welding seams 9, 10 and the elevations 11, 12 and protrude into the microchannel 8 as electrical detection elements.

The surface elevations formed by the electrode tracks 17, 18 lie in a size range that is equalized by the pressing forces produced between the covering 4 and the elevations 11, 12 in such a way that no appreciable gap spaces are produced by the electrodes.

FIGS. 5 and 6 show embodiments with elevations 11, 12, which deviate from elevations of a rectangular cross section.

FIG. 5 shows the formation of elevations 11, 12 with cross-sectional areas rounded towards the covering 4.

FIG. 6 shows the formation of elevations with the cross-sectional form of a triangle, the elevations 11, 12 rising as far as the respective edge of the recess 3.

The main advantage of the elevations shown in FIGS. 5 and 6 is that the covering 2 lies linearly against the substrate 3. Gap spaces that could remove fluid from the channel 8 by capillary action are eliminated almost entirely.

FIG. 7 explains the formation of a microchannel of a flow cell using method carried out using a laser welding device and a substrate without elevated edge regions.

A recess 3 in the form of a groove is formed in a substrate 2, e.g., in the form of a sheet, of a flow cell 1 and is closed by a covering 4 in the form of a thin sheet or film. A laser welding device includes pressing elements 5 and 6, for pressing together the substrate 2 and the covering 4, and also devices for producing a laser welding beam 7.

During the welding of the substrate 2 to the pressed-on covering 4 according to FIG. 7a near the edges of the recess 3, uncontrolled constrictions of the channel cross section occur as a result of the fluctuations of the dimensions of the welding seams explained above, and consequently unacceptable variations in the cross-sectional area of the channel 8, bounded by the recess 3 and covering 4, occur in the direction of flow.

Therefore, welding seams 9, 10 are produced by the laser welding beam 7 at a distance from the recess 3 and the channel 8, respectively, as is represented in FIGS. 7c and *d*. The distance exceeds the width fluctuations of the welding seams 9, 10, so that the welding seams 9, 10 cannot influence the cross-sectional area of the channel 8 that is formed. Component tolerances, including tolerances of the clamping receiving devices comprising the pressing elements 5, 6, may have the effect that, apart from the fluctuations originating from the welding seam, there are additional variations in the width of the edge regions 19, 20.

Disadvantageously, gap regions 19, 20, in which the two parts being joined 2, 4 only lie against one another, remain up to the sealing welding seams 9, 10. As a result of formations of the surfaces lying against one another, in particular as a result of their surface roughness, gap heights of up to several μm occur between the substrate and the covering in these gap regions 19, 20.

Fluid flowing through the channel can penetrate into the gap regions 19, 20, in particular by capillary action. This applies in particular in the case of high wettability. Fluid in the gap region can only be removed with difficulty, or not at all. There is consequently a loss of fluid. On the other hand, if a number of fluids are transported through the channel concerned, contaminations can occur. Cells and particles, for example blood cells, may be unwantedly "caught" in the gap regions 19, 20 and then excluded from further analysis and/or treatment, or they contaminate an analyte to be detected in a detection chamber.

The filling of the gap with a previously introduced filling liquid, in order to avoid loss of fluid of a liquid to be analyzed, is laborious, and in many cases impossible.

A number of embodiments of the invention have been described. Nevertheless, it will be understood that various modifications may be made without departing from the spirit and scope of the invention. Accordingly, other embodiments are within the scope of the following claims.

What is claimed is:

1. A method for forming a microchannel or microfluidic reservoir of a microfluidic flow cell, comprising: applying a flexible covering over a recess formed in a substrate of the flow cell;
   providing an elevated edge region projecting from a plane surface of the substrate and bordering an opening of the recess; and
   bonding the covering to the substrate by a seam running along the elevated edge region and at a distance from the elevated edge region, wherein through the bonding step the flexible covering is stretched over and pressed against the elevated edge region so that the flexible covering closes a storage or channel space bordered by the covering and a wall of the recess.

2. The method of claim 1, wherein the covering is bonded to the substrate by welding the seams.

3. The method of claim 2, wherein the seams are welded by laser welding.

4. The method of claim 1, wherein the covering is bonded by adhesively bonding the seams.

5. The method of claim 1, further comprising forming the recess in the substrate prior to applying the covering to the substrate.

6. The method of claim 1, wherein the covering has unstructured sheet areas without elevations and/or depressions.

7. The method of claim 1, wherein the covering is a film.

8. The method of claim 1, wherein the substrate comprises a planar surface in a region of the seams.

9. The method of claim 8, wherein the elevated edge regions comprise a planar upper surface that is generally perpendicular to the planar surface in the region of the seams.

10. The method of claim 1, wherein the covering is pressed against a triangular tip or rounding of the elevated edge regions.

11. The method of claim 1, wherein the elevated edge regions project from an upper surface of the substrate by a height of between 5 μm and 50 μm.

12. The method of claim 1, wherein the elevated edge regions have a peak along the edge of the recess.

13. The method of claim 1, wherein a melting zone is formed at a boundary surface between the substrate and the covering in an area where the seams are formed.

14. A flow cell with at least one microchannel or microfluidic reservoir obtained by the method according to claim 1.

15. A device for forming a flow cell comprising at least one microchannel or microfluidic reservoir, the device comprising:
   a first pressing element for holding a substrate and a second pressing element for holding a covering, the substrate comprising at least one substrate recess adapted to form a microchannel or microfluidic reservoir, the first and second pressing elements being adapted to hold together the substrate and the covering, the second pressing element comprising at least one pressing element cavity positioned to be opposite said at least one substrate recess when the first and second pressing elements are holding the substrate and the covering together, wherein the second pressing element extends laterally beyond an edge elevation of the substrate recess so that a seam that bonds the covering to the substrate runs along an elevated region of the substrate and at a distance from the elevated region.

16. A device for forming a flow cell comprising at least one microchannel or microfluidic reservoir, the device comprising:
  a first pressing element for holding a substrate and a second pressing element for holding a covering, the substrate comprising at least one substrate recess adapted to form a microchannel or microfluidic reservoir, the first and second pressing elements being adapted to hold together the substrate and the covering, the second pressing element comprising an elastically deformable layer that faces the covering and is transparent to a laser welding beam so that a seam that bonds the covering to the substrate runs along an elevated region of the substrate and at a distance from the elevated region.

* * * * *